United States Patent [19]

McIntire

[11] Patent Number: 5,383,259
[45] Date of Patent: Jan. 24, 1995

[54] ADJUSTABLE SHOCK CORD END

[76] Inventor: David B. McIntire, 1057 S. Eliseo Dr., Greenbrae, Calif. 94904

[21] Appl. No.: 935,758

[22] Filed: Aug. 26, 1992

[51] Int. Cl.⁶ ............................................. F16G 11/00
[52] U.S. Cl. .................... 24/300; 24/136 R; 24/265 H
[58] Field of Search ............ 24/300, 301, 298, 265 H, 24/136 R, 115 M

[56] References Cited

U.S. PATENT DOCUMENTS

| | | | |
|---|---|---|---|
| 3,751,772 | 8/1973 | Grandjanny | 24/136 R |
| 4,481,697 | 11/1984 | Bachle | 24/136 R X |
| 5,015,023 | 5/1991 | Hall | 24/136 R X |

FOREIGN PATENT DOCUMENTS

| | | | |
|---|---|---|---|
| 675231 | 8/1979 | U.S.S.R. | 24/136 R |
| 872864 | 10/1981 | U.S.S.R. | 24/136 R |

Primary Examiner—James R. Brittain
Attorney, Agent, or Firm—Owen, Wickersham & Erickson

[57] ABSTRACT

An apparatus having a collet piece in a casing for attaching to a shock cord (or rubber or rubber composite cord or strap) anywhere along the length of the cord. The substantial change in width of a circular or flat shock cord as it is stretched is used to make the width of the cord narrow. When the cord is narrow it freely moves through a passage in the collet piece unit. When the cord is released to its fully relaxed width, the cord's width is wider than the greatest width of the passage through the collet piece and casing unit. The compression on the cord creates a frictional holding force between the collet piece, casing unit, and the shock cord. A tapered opening is provided in the casing so that when the cord is pulled in one direction while the casing is held, the frictional force causes the collet piece to slide along the tapered opening thereby reducing the width of the passage through the collet piece and casing unit to grip and hold the shock cord in the passage. The gripping width automatically follows the decreasing width of the shock cord as it is stretched with increasing force. The gripping force being limited by controlling the minimum width of the passage through the collet piece and casing according to the minimum width tolerable by the shock cord to be used.

Several embodiments are disclosed which provide options for the implementation of the invention.

A hook or other connecting device can be attached to or can be integral with the casing to secure an end or an intermediate point along a shock cord.

28 Claims, 10 Drawing Sheets

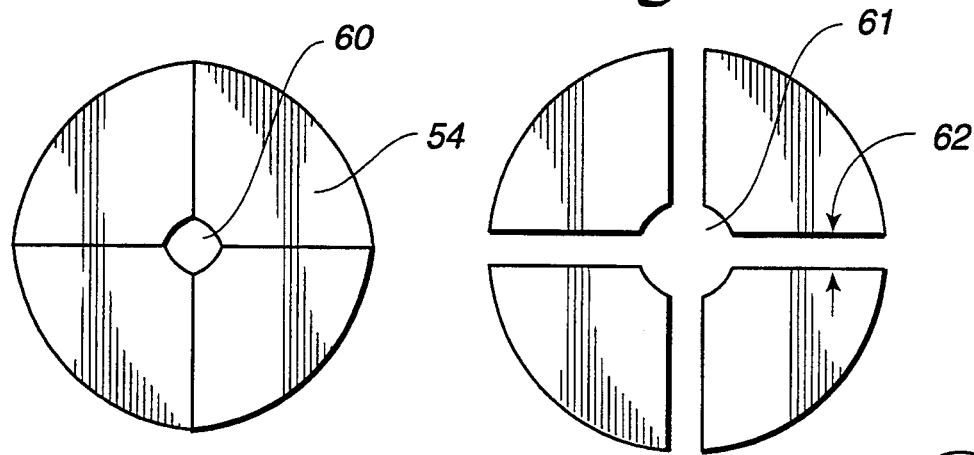
Figure 8
Figure 7
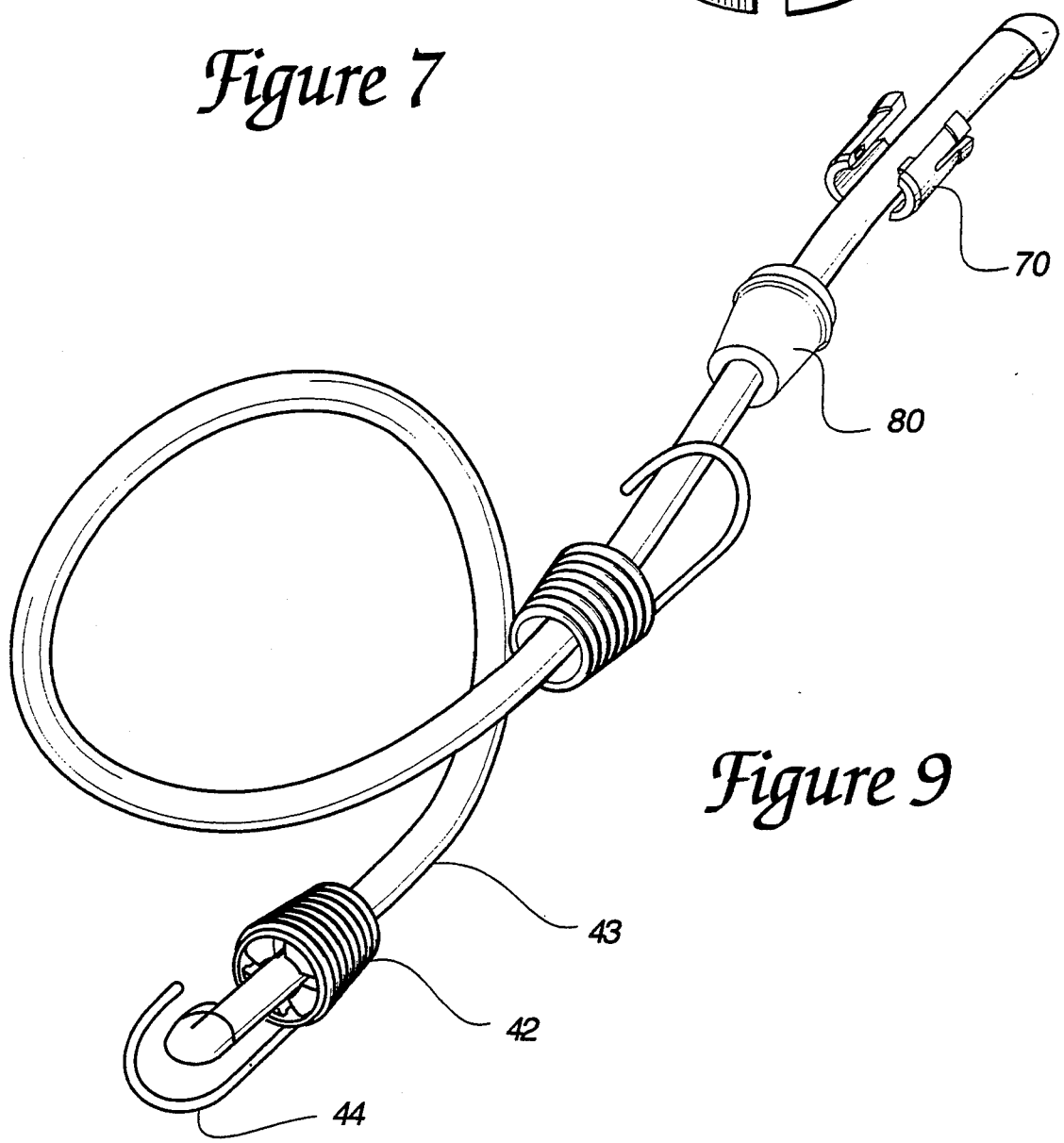
Figure 9

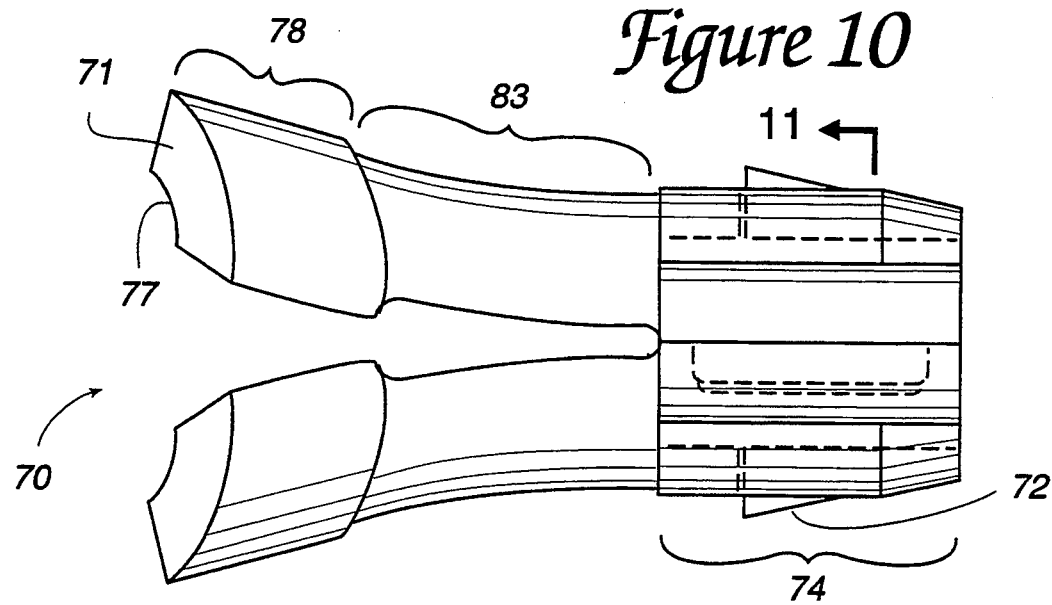
Figure 10
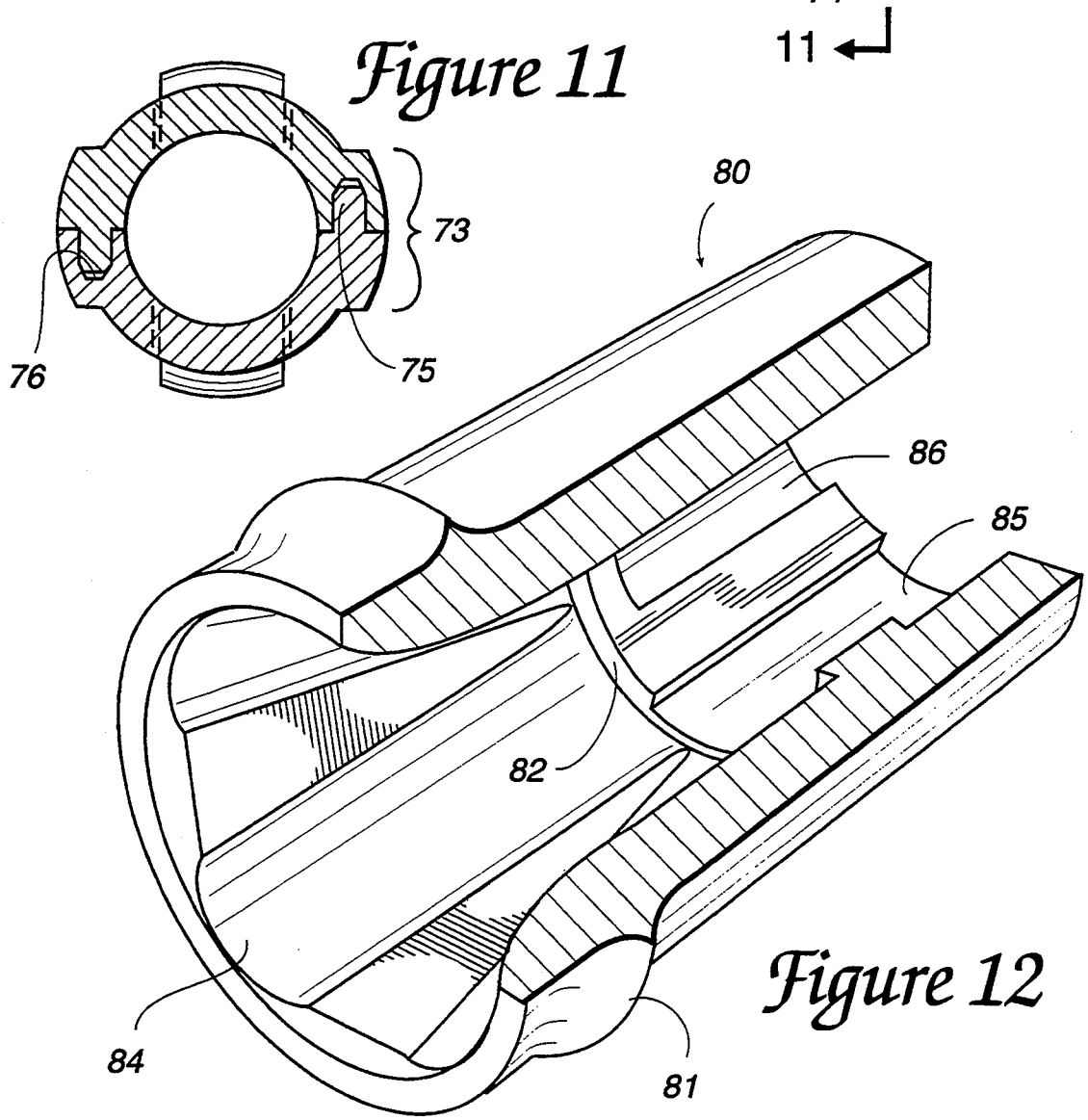
Figure 11
Figure 12

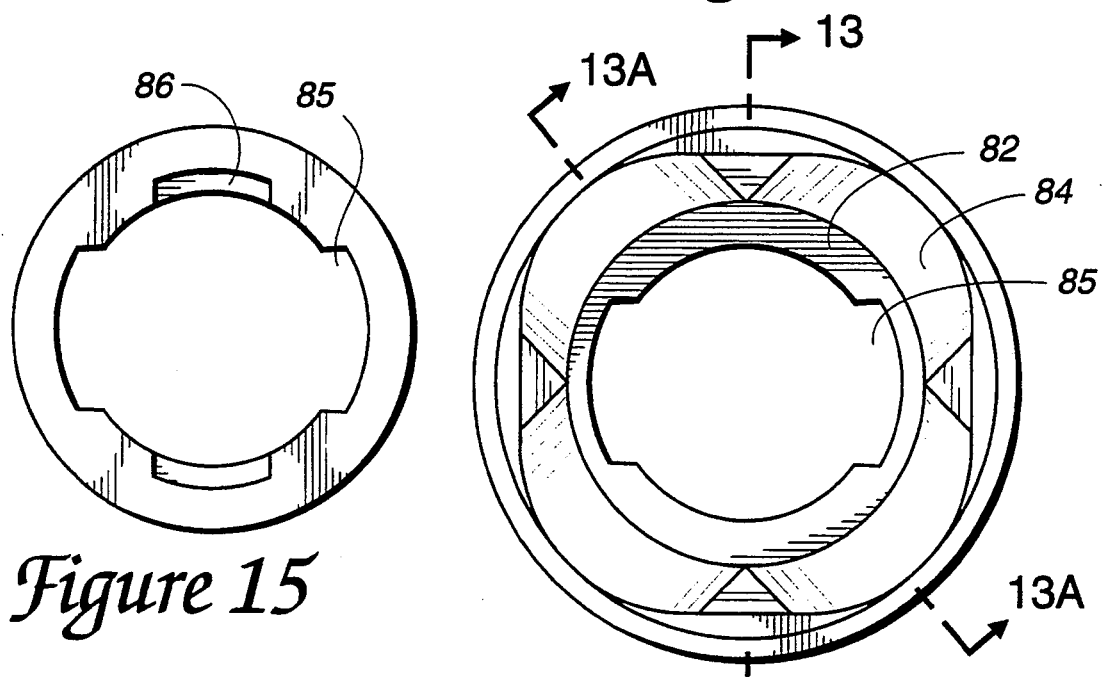
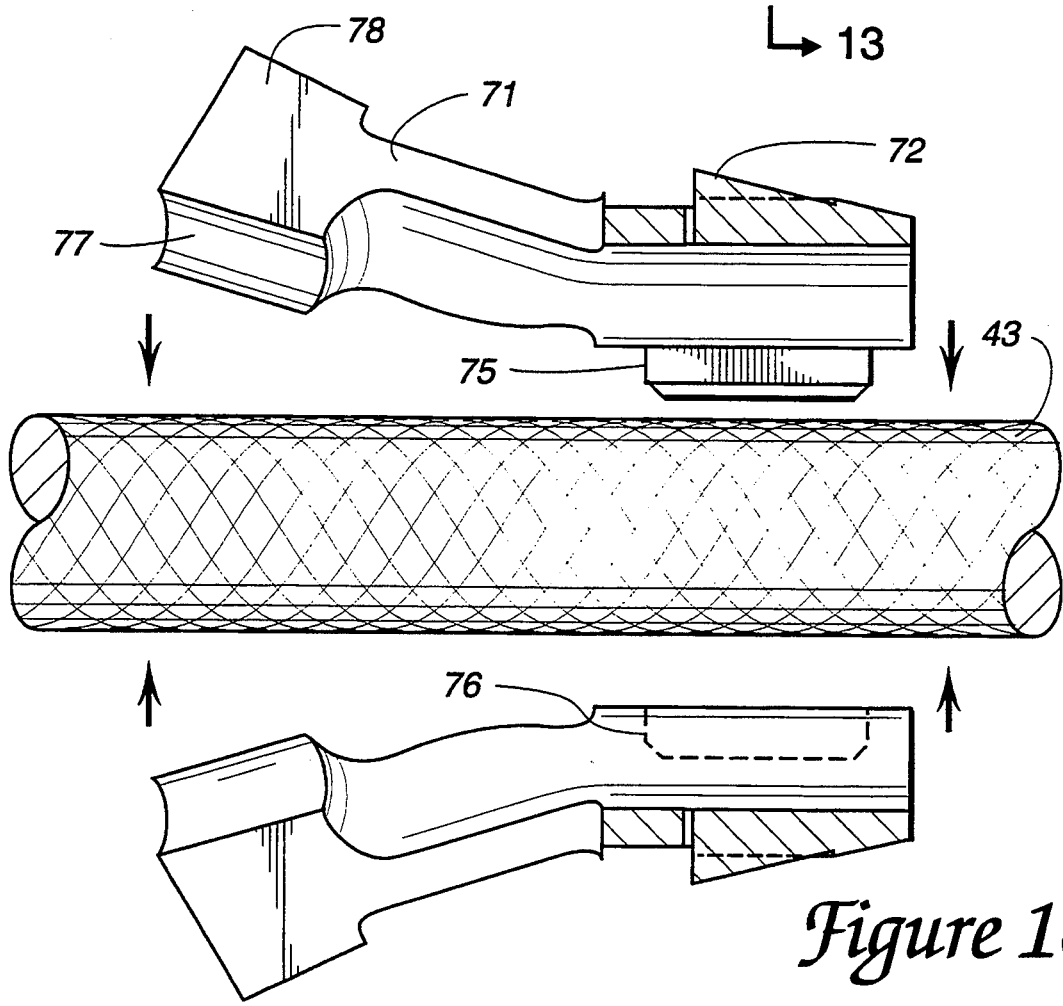

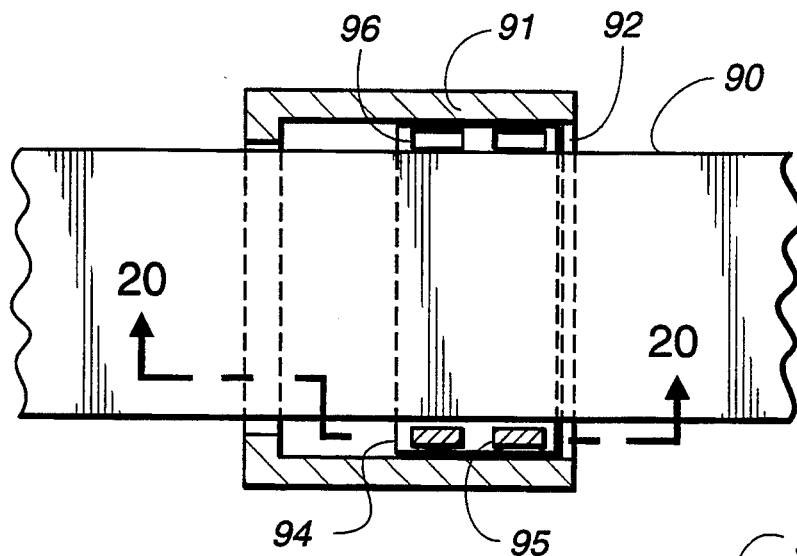
*Figure 21*
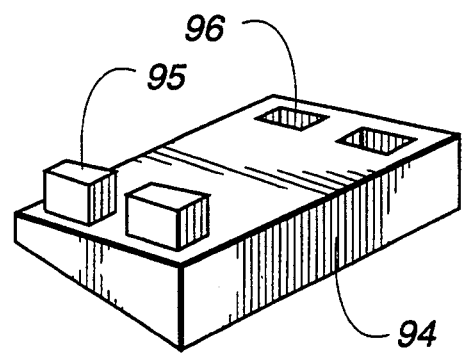
*Figure 22*
*Figure 23*
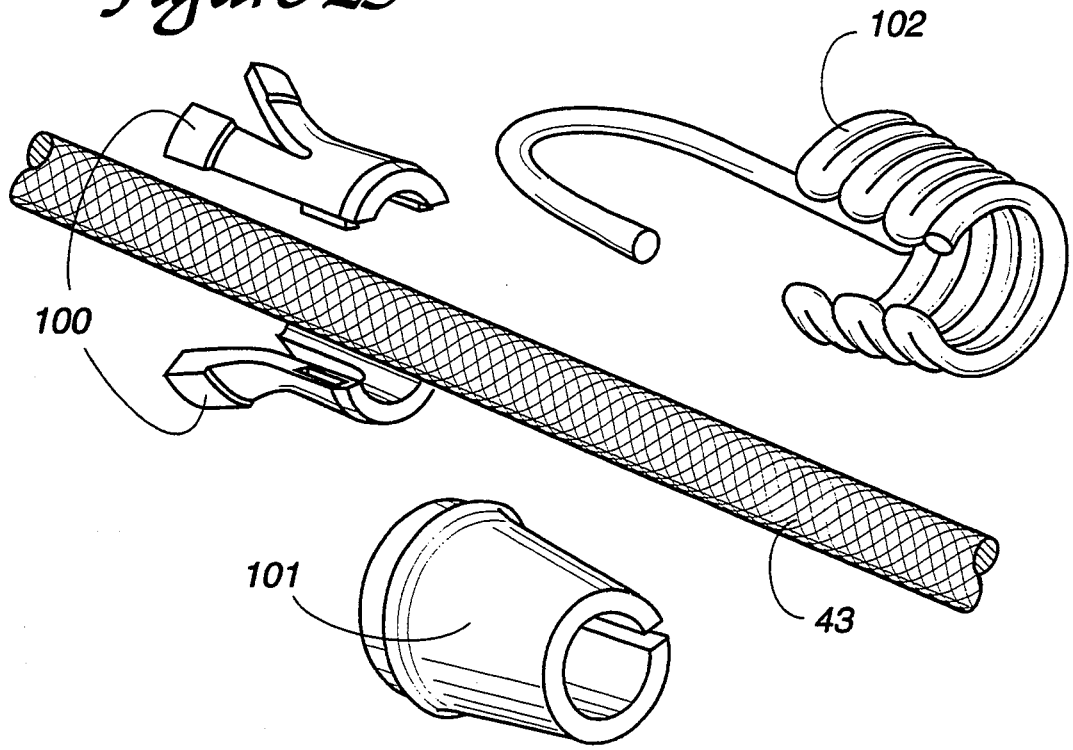

ADJUSTABLE SHOCK CORD END

BACKGROUND OF THE INVENTION

1. Field of the Invention

This invention relates to the field of shock cords (also known as Bungee cords) and rubber or rubber composite straps or cords and end pieces that are attached to the shock cords to secure the shock cord ends.

2. Prior Art

The common end configuration for a shock cord merely folds the end on itself and is held in place by a thick stiff wire clip. This folded shock cord end acts as a stop for a wire bale with a hook. The wire bale is usually tightly wound wire forming a sleeve through which the shock cord freely passes. The wire at the end of the wire bale is bent into a hook shape to make it easy to secure. The wire bale slide over the normally relaxed shock cord until the bale meets the folded end. Because the folded end is larger in diameter than the wire bale sleeve, the folded end acts a stop for the free movement of the bale. The wire clip holding the end of the cord folded on itself is very strong and creates a nearly permanent stop at the end of the cord. The wire clips holding the shock cord ends folded are difficult to install or replace. Therefore once a shock cord length has been chosen and the shock cord ends have been folded and secured with wire clips, the usable range of the shock cord is permanently set.

To use the shock cord, one end is secured, the cord is stretched, and then the other end is secured. When the tension of the cord is wrong, its points of attachment must be changed to accommodate the existing cord length or a shock cord of a different length must be used. In one known configuration a plastic hook piece has replaced the wire bale at one end of the shock cord. The plastic hook piece slides freely over the relaxed cord. At the desired length, the user bends the cord 180° and forces the cord into a narrow slot, severely constricting the cord at that point. The free end of the cord is then pressed into a "jam cleat" type securing slot on the plastic hook piece to help prevent the cord from coming out of the slot into which it has been folded. Repeated or prolonged use of the plastic hook piece reduces the life of the cord as the highly constricting slot holding the cord severely pinches the cord at that point. This severe pinching action strains the cord excessively and damages it a little every time the plastic hook piece is attached, eventually resulting in premature failure.

The core of shock cords is an elastomeric substance. Elastomeric substances breakdown with time and exposure to the environment. A new shock cord that may have good tension for a particular application when new, will lose tension over time and may become unacceptable. The cord will then have to be replaced with another one having the desired tension, or the length could be adjusted, for example by using the plastic hook piece already described. The damaging effect of the plastic hook piece slot will soon cause the elastomer to fail and the cord to lose it shock absorbing qualities.

SUMMARY OF THE INVENTION

This invention solves the above mentioned problems by providing a structure that can be placed at any point along a shock cord (or rubber or rubberized composite cord) to positively secure a hook or other connection device to the shock cord with a minimum of damage to the cord. The structure can easily be moved to any other point along the shock cord to lengthen or shorten the usable length of the cord while simultaneously adjusting the shock cord tension accordingly.

The gripping force of the structure on the shock cord is distributed over a larger area than previous devices to reduce the possibility of premature damage to the cord and its core.

The substantial change in diameter of the shock cord, as it goes from its fully relaxed state (no tension) to being stretched, is used to engage and release a casing and collet piece structure to and from a particular location on the cord. The width of a passage for the shock cord in the casing and collet piece structure is less than the fully relaxed shock cord width. When fully relaxed, the shock cord is held in the shock cord passage of the casing and collet piece by the interference between the respective widths of the shock cord and the passage. When the shock cord is stretched, the width of the cord is significantly reduced due the high elasticity of the cord (its large Poisson's Ratio), thereby releasing the interference between the widths of the cord and the passage for the shock cord in the casing and collet piece structure allowing the cord to move freely through the casing and collet piece structure.

In one embodiment the collet piece is a sleeve around a central axis with four symmetrical jaw arms extending from the edge of the sleeve forward toward a top end of the sleeve. The jaw arms extend at an angle forward and away from the central axis, like a set of open jaws. The collet sleeve piece is engaged with a cylindrically shaped casing by elastically forcing the two together along the central axis into a position where matched pieces of the two parts prevent their disengagement. A special tool is then used to reach through the passage in the collet and casing to grab an end of a circular shock cord and pull through the passage while keeping it slightly stretched so that it passes through the passage without interference. Once the shock cord is released it expands to its fully relaxed dimension which is larger than the available width for the cord in the passage and is held there by the interference between the diameters. After the cord is installed, any force pulling the cord toward the bottom of the sleeve, because of the interference with the collet, will pull the collet piece down the tapered opening of the casing causing the collet piece and casing passage to become smaller and grab and squeeze the cord more tightly with every incremental movement, thereby creating a positive stop for the end of the cord. To adjust the point of attachment the cord around the collet piece/casing must be stretched, to reduce its diameter and release the interference, and as the cord is stretched the collet piece/casing can be easily slid along the reduced cord diameter to the desired new location.

Another embodiment provides a collet piece in two halves that are assembled around the shock cord, after the shock cord has been threaded through the casing. Once the two piece collet is assembled the casing is brought next to it and the two pieces are pressed together to interlockingly engage the two piece collet with the casing. Once interlocked the pieces interact the same as the previously described embodiment. The two piece collet and the corresponding sleeve can have pivoting locking projections, key tabs, locking projection receiving slots, and key tab receiving slots, to align the collet piece to the casing sleeve when desired.

In another embodiment, a flat strap-like shock cord is used and collet piece and casing have generally flat surfaces that cause the collet piece to wedge the shock cord when the shock cord is pulled out the bottom of the "V" shaped casing. A hook or other attaching structure is attached to or integral with the casing.

BRIEF DESCRIPTION OF THE DRAWINGS

FIG. 7 is a top end view of the collet of FIG. 5;

FIG. 8 is a diagram showing the general dimensional relationship for the collet piece jaws;

FIG. 9 is and overall view of the pieces of another embodiment of the invention;

FIG. 10 shows a side view of the assembled two-piece collet of FIG. 9;

FIG. 11 shows a cross sectional end view of FIG. 10 cut at 10—10;

FIG. 12 shows an cross sectional cut-out perspective view of the casing of FIG. 9;

FIG. 14 shows a top end view of the casing of FIG. 12;

FIG. 15 shows a bottom end view of the casing of FIG. 12;

FIG. 16 shows a cross sectional view of the two piece collet being assembled around a shock cord;

FIG. 21 shows a top cross sectional view of the embodiment of FIG. 19;

FIG. 22 shows a perspective view of a wedge (collet) piece of the embodiment of FIG. 19; and FIG. 23 shows another embodiment of the invention, showing attachment anywhere along the shock cord.

DETAILED DESCRIPTION

This invention provides a structure which simply and easily overcomes the problem of securing loads or tensioning lines of an infinite degree of sizes, shapes, and desired tensions. A strong fabric covered elastic cord (shock cord) is often used to tie down unenclosed loads on truck and in other places. The elastic nature of the cord allows the user to provide a desired amount of pressure to the load, through out the trip. Ropes often lose their initial tension when the load shifts or knots loosen. This invention requires only that the shock cord be stretched to change the point of attachment. Reattachment is automatic when the stretched cord is released. The invention is infinitely adjustable as it can be attached at any location along the cord. Once attached, the invention will hold a very large load without slipping while minimizing the degradation of the shock cord, by spreading out the force crimping the cord to hold it from slipping over a wide area.

Figure 1:
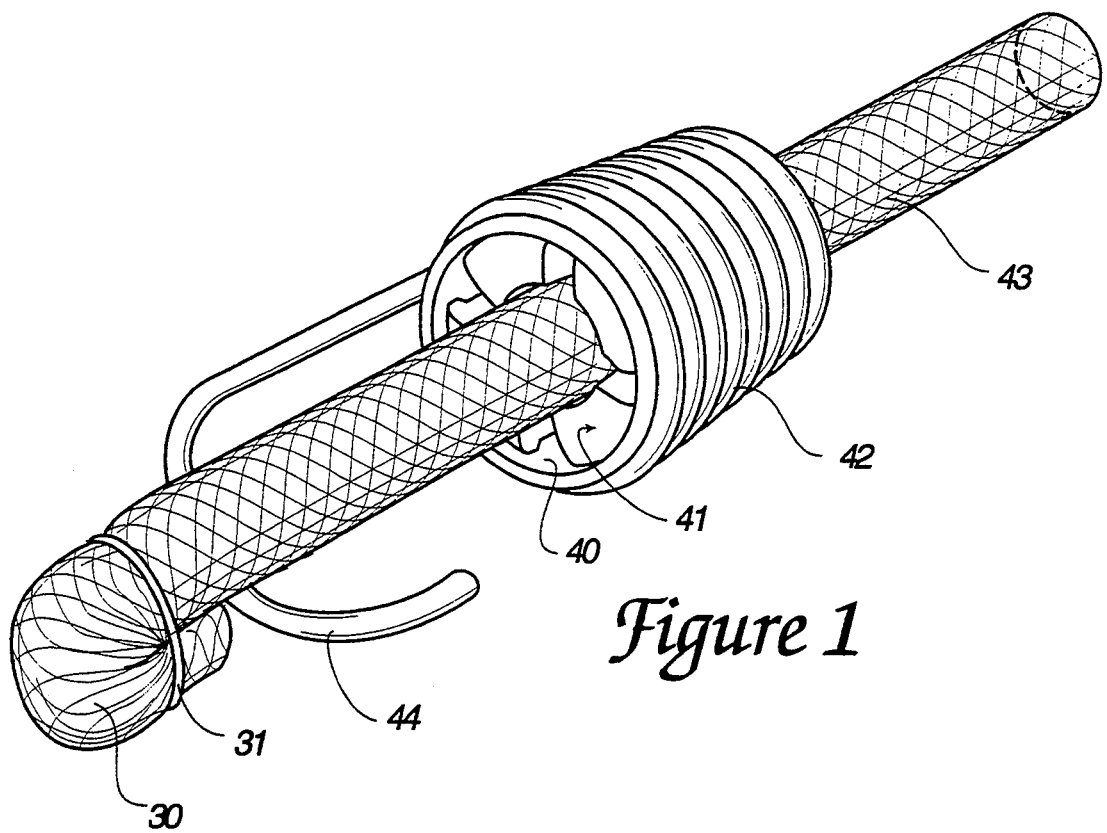
FIG. 1 is a perspective view of an embodiment of the invention.

An embodiment of the invention is pictured in FIG. 1. A shock cord 43 is threaded through an end piece including a collet piece 41 within a circular collar (casing) 40 which is retained inside a wire bale 42 with a hook 44. The end of the shock cord 43 shown presents the usual folded end 30 of the shock cord held closed by a wire clip 31.

Figure 2:
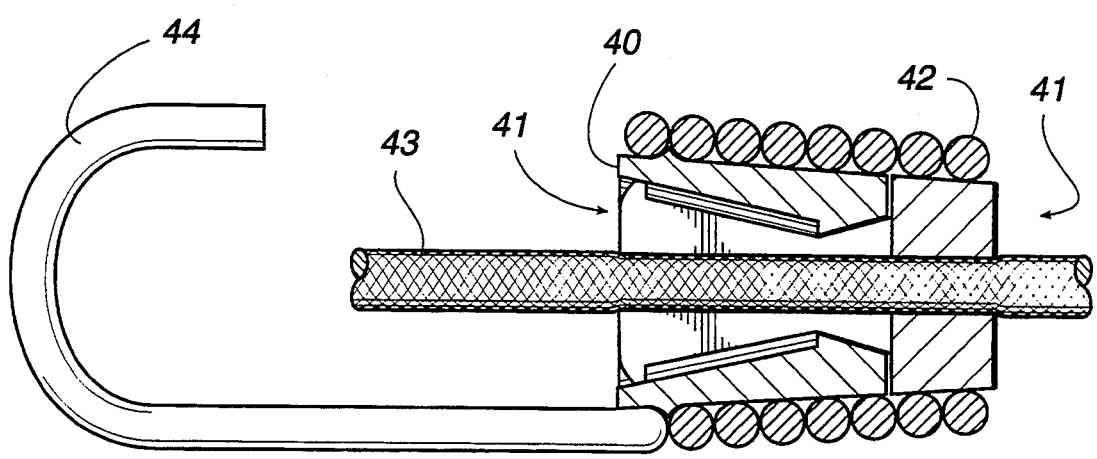
FIG. 2 is a cross sectional view of FIG. 1.

A cross section of the embodiment of FIG. 1 is shown in FIG. 2. The collet piece 41 shown has four jaws at its left end and a collet sleeve at its right end. As the collet moves to the right within the casing 40 the jaws of the collet piece 41 are pressed into the shock cord 43 to grip it tightly. The diameter of the shock is shown in its fully relaxed state. The internal diameter of the collet piece sleeve is less than the outside diameter of the shock cord 43, resulting in an interference fit between the pieces when the cord is fully relaxed. When the cord 43 is pulled to the right (as shown in FIG. 2) the friction in the interference between the collet and the cord causes the collet to move to the right and causes the jaws of the collet to close down on the cord 43. As the jaws start to close a tension is created in the shock cord and the shock cord diameter starts to shrink. Since the collet piece jaws gripping the shock cord 43 continue to close according to the taper of inside surface of the casing 40 the shock cord is held fast by the jaws and does not slip even though its diameter is now greatly reduced. This is in contrast to ropes whose diameter reduction is substantially less under similar circumstances. And in contrast to the present shock cord end which is fixed and is held by a folded end or knot being placed in the shock cord, such folded end or knot being so large that it is stopped by the smaller diameter of the opening in the wire bale and attached hook.

To move the holding device on the cord, tension must be released and collet 41 returned to a position where its jaws are open. Then the shock cord 43 is stretched, to reduce its diameter until the diameter of the shock cord is less than the inside diameter of the collet sleeve. Once there is no longer interference between the pieces the casing/collet piece 40,41 can move easily along the shock cord 43. This is in contrast to the usual shock cord which cannot be adjusted or whose knot must be untied or where another size and or length shock cord must be obtained.

Figure 3:
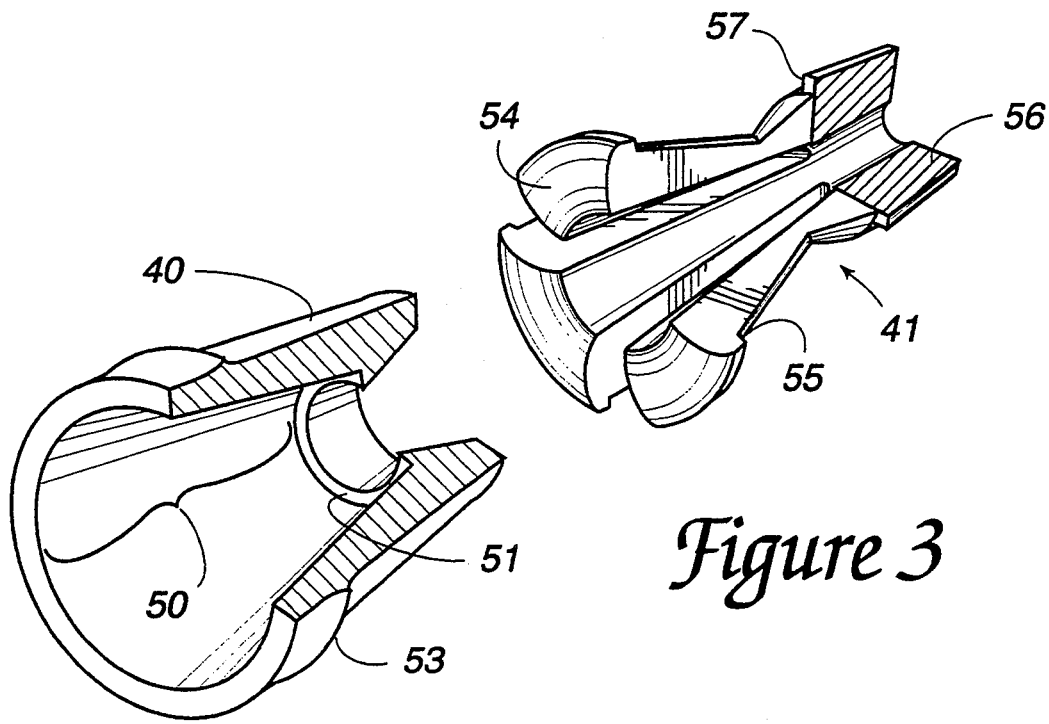
FIG. 3 is a cut-away exploded cross sectional view of the embodiment of FIG. 1 without the shock cord and wire bale.

In FIG. 3 a cross sectional exploded view of the collet piece 41 and the casing 40 can be seen. The casing 40, has a wire engaging projection 53 that tracks a helical path around the outside of the casing and engages the spaces between the wires of the wire bale 42, to prevent the casing from sliding out of the somewhat taped wire bale 43. A tapered section 50 in the top section of circular casing 40 provides a backing along which the outer edge of the jaws 54 of the collet slide as the collet moves in the casing. A land 51 at the bottom of the tapered section 50 matches a flange 55 at the outer edge of the top end of the jaws 54. These mating pieces act as a stop to limit the range of motion of the collet toward the bottom of the casing. When the collet reaches the land 51 the shock cord is already held very tightly at its minimum diameter without damaging the shock cord 43. The land 51 prevents the collet from slipping any further, even when a substantial force is applied.

The collet piece 41 includes collet jaw arms 54 extending from a collet sleeve 56. The collet sleeve 56 is spaced from its surrounding bottom part of the wire bale 42 by collet sleeve spacing flanges 57. The spacing flanges 57 are positioned at 90° around the collet sleeve 56.

Figure 4:
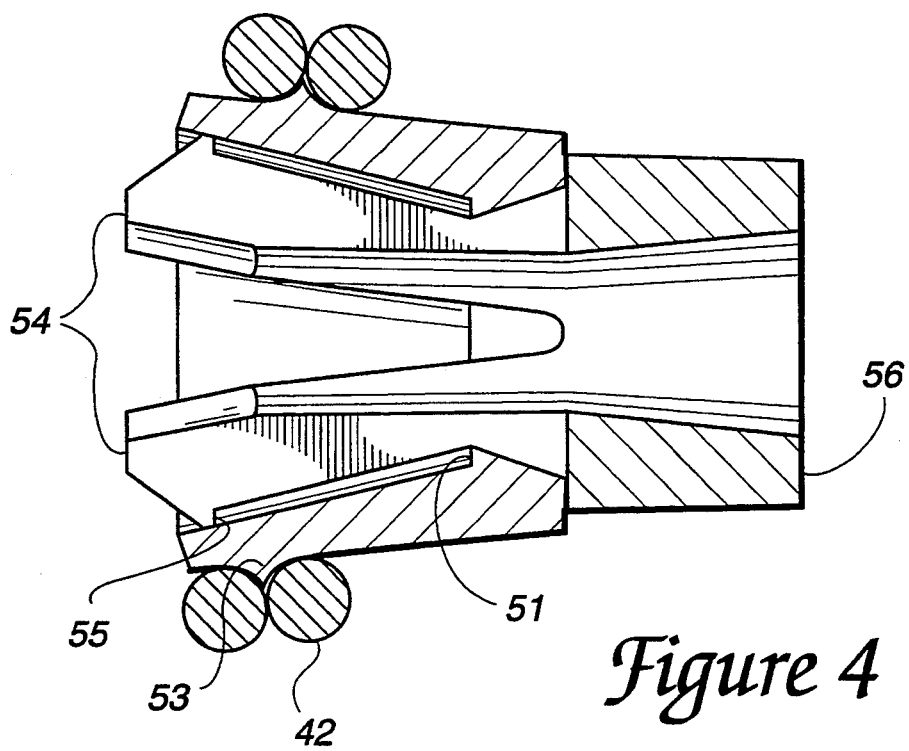
FIG. 4 is a cross sectional view of FIG. 3 when assembled.

FIG. 4 shows an enlarged close-up view of the collet piece 41 and the casing 41 without the shock cord. The functional description is the same as discussed above except that the inner surface of the collet sleeve 56 is tapered rather than cylindrical as described above.

Figure 5:
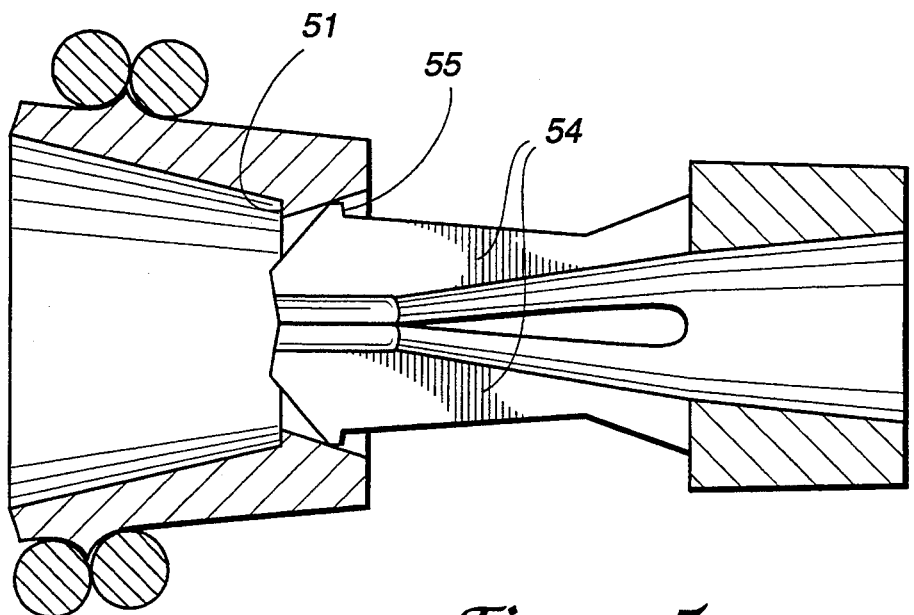
FIG. 5 is a cross sectional view of FIG. 3 as configured in preparation for assembly.
Figure 6:
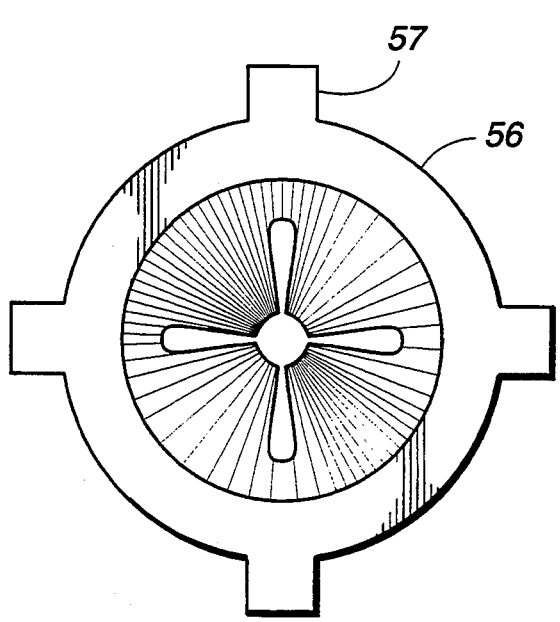
FIG. 6 is a bottom end view of FIG. 5.
Figure 6A:
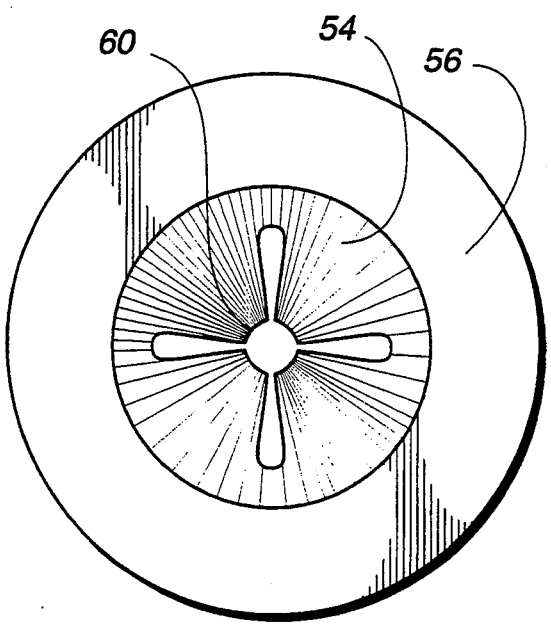
FIG. 6A is an alternate configuration to FIG. 6, showing the bottom end view of FIG. 5.

FIG. 5 shows a the collet sleeve piece 41 in position to be assembled with the casing 42. As can be seen in FIG. 5 the outer diameter of the top end of the jaws even when the jaws are touched each other is grater than the internal diameter of the casing at the land 51. However since the pieces are preferably constructed of a hard self-lubricating thermoplastic (e.g., Delrin) and are slightly resilient, the collet piece jaw ends can be forced past the short constriction of the inner diameter of the casing at the land 51. Once the pieces are engaged it will be very difficult if not impossible to later separate them. Two alternate views from the bottom end of the collet sleeve 56 as shown in FIG. 5 are shown in FIGS. 6 and 6A. The tapered slots between the touching jaws allow the jaws to close to a smaller size than the normal diametric dimension of the jaws. FIG. 6 shows a collet sleeve with collet sleeve spacing flanges 57, while FIG. 6A shows an alternate embodiment with a full skirt for the collet sleeve 56. FIG. 7 and 8 illustrate the dimensional relationship of the jaws to a circle. FIG. 8 shows the jaws 54 in a perfect circular relation. The central core circle being sized to be 1/16 to ¼ of an inch smaller than the fully relaxed outer diameter of a corresponding shock cord. Shock cord diameters vary and therefore the correct spacing depends on the actual shock cord dimensions and properties. FIG. 7 shows a close-up of an end of the collet jaws when the jaws 54 are touching one another note that the central hole is not round, but is made up of sections of the jaw arcs as shown in FIG. 8. The dimensional configuration of the jaws 54 varies according to their degree of opening. While the jaws are formed (e.g., injection molded) their shape is designed to match the shock cord to be held, but the jaws are molded to be open wide until they are closed by the force of the tapered inner surface of the casing.

An over-all view of a second embodiment of the invention is shown in FIG. 9. A two piece collet 70 engages a casing 80. A wire bale and hook 42, .44 can be engaged with the two piece collet casing 80 as described for the embodiment above.

FIGS. 10 and 11 show a close up of the two piece collet 70. In this side view of the two piece collet 70 only two of the four collet jaws 72 can be seen. The jaws have a nose portion 78 with a gripping portion 77. The nose portion 78 provides a solid block through which the force closing the jaws (created as the collet is drawn into the casing) is evenly distributed as the closing force is transmitted to the shock cord at the center of the collet. A jaw neck portion 83 has a diameter less than the nose portion 78. Each arm neck portion 83 does touch its adjacent arm 72 so to assure that all the binding gripping of the collet on the shock cord is through the nose portion 78. The jaw neck portions 83, if improperly formed might touch each other and bind with each other to prevent the arm nose portions 78 from coming into full contact with the shock cord to hold the cord firmly. The two sides of the collet are identical and apart from their connecting tab structures 75, 76 are symmetrical about their mating surface. The two halves of the sleeve portion of the collet 74 create a sleeve that surrounds the shock cord when assembled. The connecting tab 75 and a corresponding hole 76 are mated to make the sleeve portion 74. An angled projecting locking tab 72 allows the collet to be snapped into place in its casing 80 as shown in FIGS. 12 thru 18. The outside edge of the sleeve portion 74 around the mating surfaces of the two halves form a key projection 73 that is 90° to the locking tabs 72. The key projections 73 interact with key slots 85 in the casing 80 to keep the two halves together, aligned, and in interference contact with the shock cord.

FIG. 12 shows a cut-away cross section of the casing into which the collet of FIGS. 10 and 11 is be introduced. A wire engaging projection 81 is provided on the outside near the top of the casing 80 this is a helical ridge which matches the spacing between the wires of the wire bale. The wire engaging projection acts as a mechanical stop to prevent the casing 80 from easily coming out of the wire bale when in use. An inner circumferential land 82 at the bottom of the tapered portion of the casing provides a collet stop all around the bottom of the tapered section. The land 82 acts as a stop when the bottom edge of the nose portion 78 of the collet meets the land 82. Having the land all around allows uniform distribution of the stopping force when the bottom of the nose portion 78 reaches the land 82. A pair of key slots 85 partially interrupt the land 82 to provide guidance for the collet key projections 73 in the casing 80. A locking tab slot 86 has a top edge which cooperates with the locking tab 72 on the two piece collet 70 to act as a stop to prevent the collet 70 from backing out the top of the casing 80. A set of four approximately equally spaced circular arc depressions 84 whose arc radii match the outside of collet jaw arm arc 84 are provided around the surface of the inside of the tapered portion of the casing. Matching the radii of the arcs of the outer surface of the nose portion 78 and the depressions on the inner surface of the tapered portion of the casing evenly distributes the load from one structure to the other and avoids pressure points and damage to the pieces when the nose portion's outer surface rubs against the inside of the casing with great force.

Figure 13:
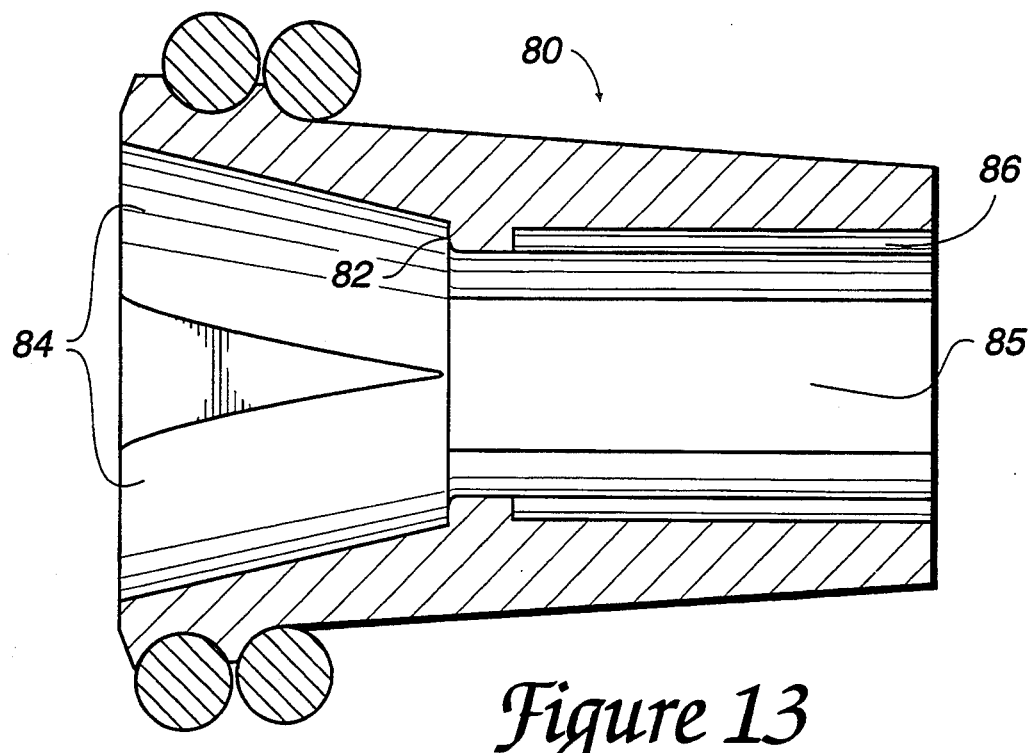
FIG. 13 shows a cross sectional view of the casing of FIG. 9 cut at 13—13 as shown in FIG. 14.

A side cross sectional view of the casing 80 as shown in FIG. 14 for the two piece collet 70 is shown in FIG. 13. The locking tab slots 86 are at the top and the bottom of the central passage of the lower portion of the casing 80. The key slots 85 (only one of which is shown in this cross-section) extends from the land 82 at the bottom of the tapered portion of the casing to the bottom end of the casing. A second cross section of the casing of FIG. 14 as cut at 13A—13A is shown in FIG. 13A.

Figure 13A:
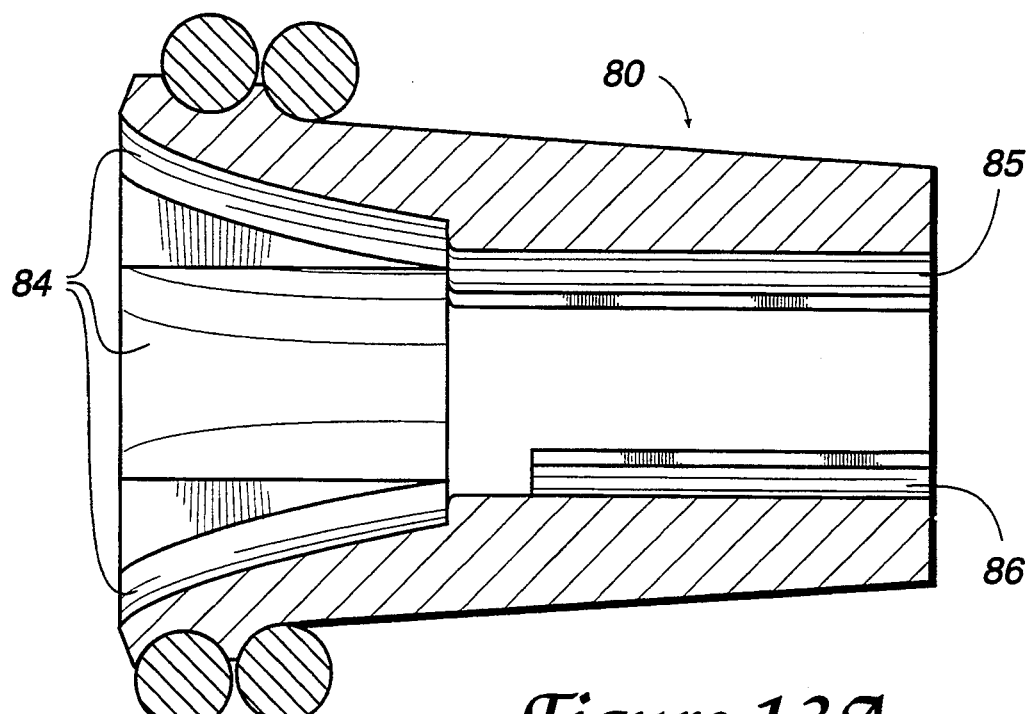
FIG. 13A shows a cross sectional view of the casing of FIG. 9 cut at 13A—13A as shown in FIG. 14.

FIGS. 14 and 15 show top and bottom views, respectively, of the casing 80 shown in FIGS. 12, 13, and 13A. The reference numbers match the already described structures.

FIG. 16 shows a side cross sectional view of the two halves of the two piece collet being in position to be placed around the shock cord 43. The four arrows show the movement performed to join the two halves of the collet assembly. The two halves when joined form a sleeve having a diameter slightly less than the fully relaxed diameter (width) of the shock cord 43. An continuous clamping force is needed to keep the two halves fully engaged. An alignment tab 75 together with an alignment hole 76, one on each collet half, helps to line up the two halves of the collet to ease their assembly and provide added structural integrity. The alignment tabs and holes 75, 76 allow the two collet halves to easily become correctly fully engaged if they are not when initially introduced into the casing 80 (FIG. 17).

The jaw arms 71 of the collet include a nose portion 78 which act as wedge blocks between the arc depression tapered portions of the casing 80 and the shock cord passing through the two piece collet and casing. Jaw arm gripping surfaces 77 contact the side of the shock cord as the nose portion wedge blocks 78 move closer together to grab the shock cord as it stretches. The gripping surface 77 shown in FIG. 16 is smooth. Other surface contours such as teeth perpendicular to the shock cord or ridges or depressions could be used to change the gripping characteristics of the gripping surfaces. The use of teeth tends to make the shock cord outer surface wear out faster.

When the two piece collet 70 is introduced into the casing 80 (FIG. 17, shock cord not shown), the key projection 73 (FIG. 11) of the collet 70 is aligned and introduced into the key slot 85 of the casing 80. As the collet 70 moves further into the casing 80 the locking tabs 72 of the collet bind and are forced to pivot by the land 82. Once the locking tabs 72 have reached the locking tab slot 86 they spring out into the slot and prevent the collet from coming back out the top of the casing 80.

Figure 17:
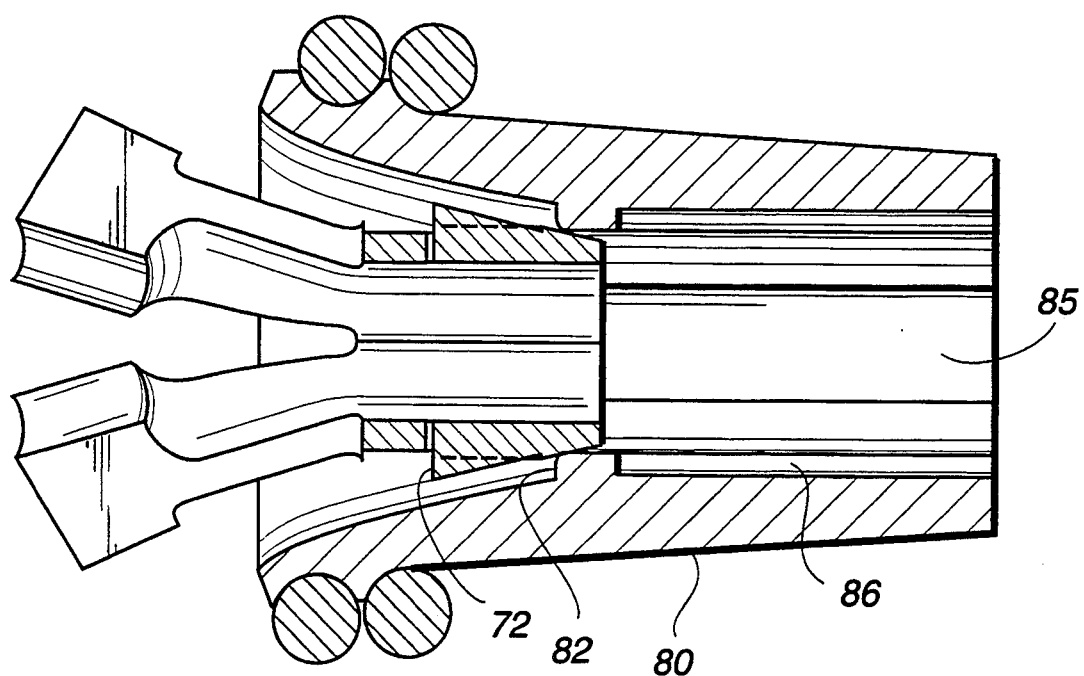
FIG. 17 shows the assembled two piece collet of FIG. 16 (without the shock cord) configured for assembly with the casing.
Figure 18:
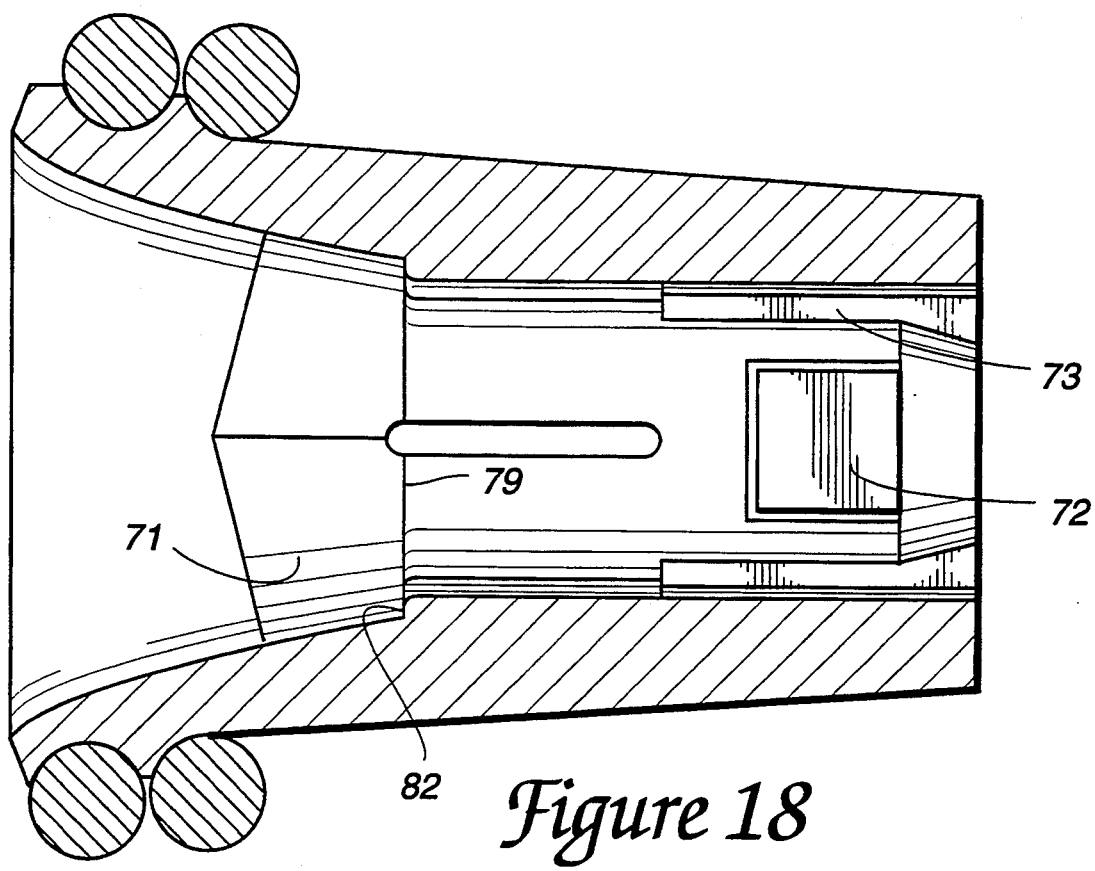
FIG. 18 shows a cross sectional view of the casing with the assembled two piece collet of FIG. 16 positioned against its stops (the land) in the casing.

The cross section of FIG. 18 is 90° to FIG. 17. The two piece collet 70 is shown at its travel limit in the casing 80, the bottom of the nose portion 79 of the jaw arms resting against the land 82 in the casing. The locking tab 72 and the key projection 73 are shown. A slot 87 is formed from the relieved portion of the jaw arms as they come together when the jaw nose portions are touching. Relieving the neck portion of the jaw arms reduces their cross sectional area and increases their flexibility and springiness. The collet pieces are molded with their jaws wide open. Repeated bending of the arms away from the position in which they were molded can cause material fatigue and failure. Reducing the cross section of the neck area reduces the likelihood of failure.

Figure 19:
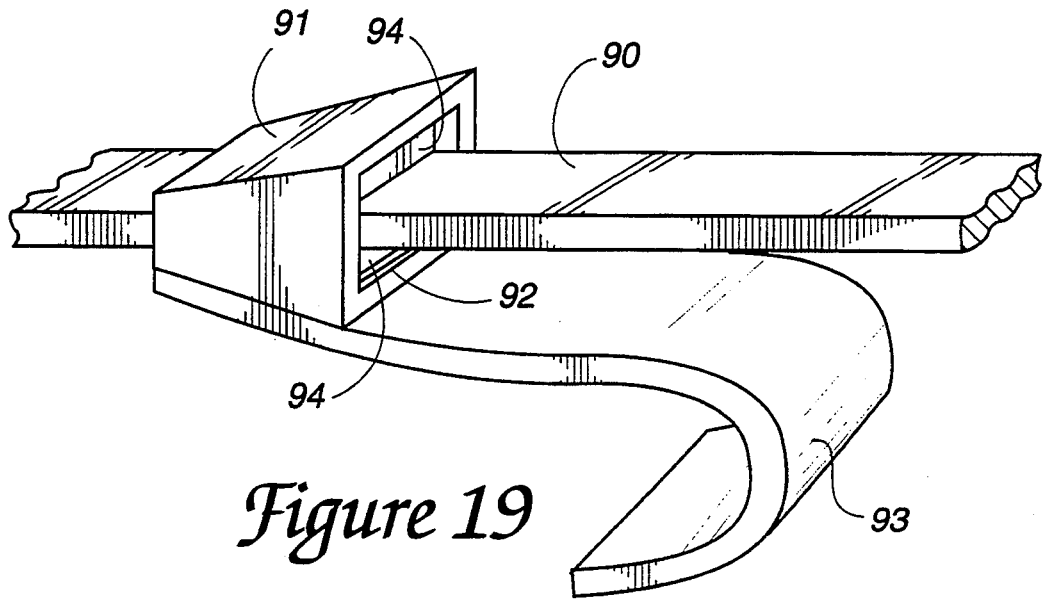
FIG. 19 shows a perspective view another embodiment of the invention acting on a strap shock cord.
Figure 20:
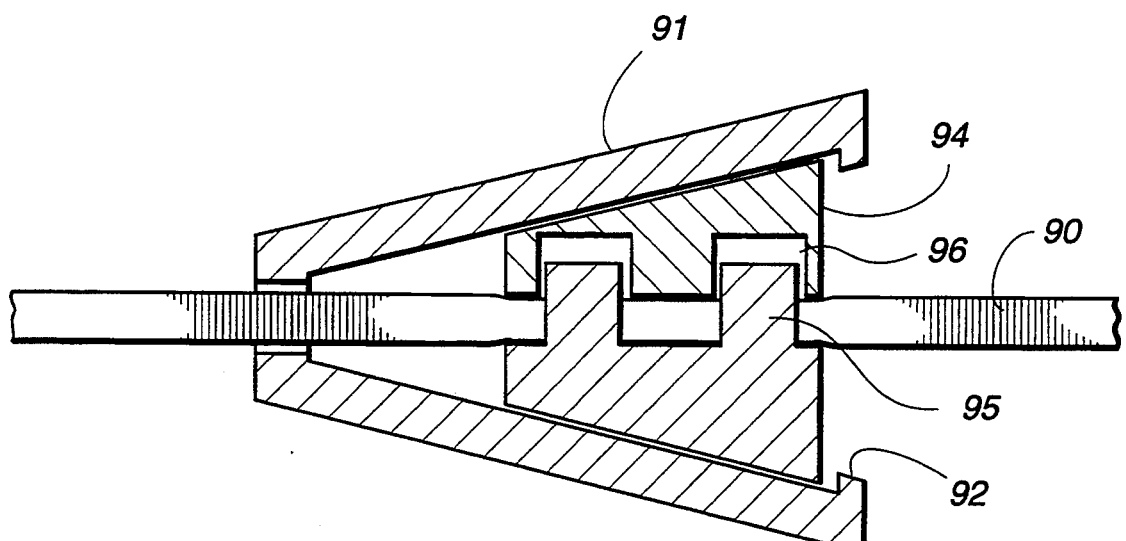
FIG. 20 shows a side cross sectional view of the embodiment of FIG. 19.

An embodiment to hold and adjust a holding position on the shock cord strap (flat rope, belt) 90 is shown in FIG. 19. A hook 93 is connected to a "V" shaped casing 91. The strap shock cord 90 passes through the "V" from bottom to top. Two wedge shaped collet pieces 94 (FIGS. 20, 22) having alignment tabs 95 and alignment holes 96 surround the strap shock cord 93 and engage each other. The two collet pieces 94 are then pressed together to slightly compress the strap shock cord 90 and into the wide end of the casing 91, past a set of collet travel stop flanges 92 at the inside of the front edge of the casing 91. Side and top cross sectional views of the assembled unit are shown in FIGS. 20 and 21. At the extreme travel limit of the collet pieces 94, when they are adjacent to their travel stops 92, the passage between the collet pieces 94 has a width less than a fully relaxed thickness of the strap shock cord 90. As can be seen in FIG. 20 the cord 90 is compressed as it passes between the collet pieces. When the strap 90 is pulled opposite the hook 93 the friction between the strap 90 and the collet pieces 94 pulls the collet pieces further into the base of the "V" thereby reducing the width of the passage between the collet pieces 94 and gripping the strap more tightly.

To move the location of the collet and casing on the strap 90, the collet pieces must be located at approximately their widest separation. The strap is then stretched. As the strap is stretched its width is reduced until it is less than the distance between the two collet pieces 94. The friction between the strap 90 and the collet pieces is thereby released and the collet piece and casing unit can then move freely along the strap as required by the user. When the desired location is reached the strap 90 is released to its fully relaxed width again creating a frictional force between the collet pieces and the strap to hold the unit in place at its new location.

The collet pieces described in each of the above embodiments describe a means for centering the shock cord or strap shock cord in the casing, while such centering is functionally efficient and aesthetically pleasing, centering is not required to use the invention. In all cases, a single jaw or collet piece on only one side of the shock cord constrained by only the tapered passage of the casing on the other side of the cord will perform the same function.

Each of the described embodiments pictured is implied to be at the end of a shock cord. These same structures can be used at intermediate points along a shock cord to positively locate and adjust intermediate points of adjustment when using a long cord to go back and forth over a load such as on a pickup truck with hooks along the side of the truck bed.

An embodiment for placing the collet and casing on the shock cord at intermediate points is shown in FIG. 23. An intermediate portion of the shock cord 43 is shown. A split sleeve/casing 101, similar to the casings discussed above, is spread and slipped over the side of the shock cord 43. A two piece collet 100 (or a one piece collet split on one side like the split casing) is placed on the shock cord 43. An open sided wire bale 102 wound from one stiff wire turning on itself around approximately 270° of a circle with a hook at one end provides an outer rigid holding device. The split casing/sleeve 101 is slid into the slightly conical open sided wire bale 102 and oriented so that the split side of the split casing/sleeve 101 is approximately 180° from the open side of the open sided wire bale 102. The wire of the wire bale 102 being very stiff will for all practical purposes not yield or deflect when the split casing/sleeve 101 is in place with the collet 100 at its center. When a tension force is applied to the shock cord 43 causing the collet piece to be drawn further into the split sleeve/casing 101, the open sided wire bale 102 will hold tight.

The above descriptions universally refer to a shock cord as the force transmitting member. However, rubber, rubber composite, or any elastomeric type rope or strap could be used just as the shock cord is used and described above. The use of other materials would require that the collet piece and casing dimensions be adjusted to match the cord and strap dimension to be used.

While the invention has been described with regards to specific embodiments, those skilled in the art will recognize that changes can be made in form and detail without departing from the spirit and scope of the invention.

I claim:

1. An adjustable holding device comprising:
   a shock cord having a fully relaxed shock cord width dimension and a stretched shock cord width dimension,
   a casing having a longitudinal axis, said casing having a tapered opening generally parallel to said longitudinal axis, said tapered opening having a wide end and a narrow end, said shock cord being disposed within said opening passing from said wide end to said narrow end, and
   a collet piece disposed in said opening adjacent said shock cord and said casing,
   said shock cord being disposed in a passage in said tapered opening wherein a narrowest width dimension of said passage varies as said collet piece moves within said tapered opening from said wide end of said tapered opening to said narrow end of said tapered opening, wherein said narrowest width dimension of said passage when said collet piece is at said wide end of said tapered opening is less than said fully relaxed shock cord width dimension and is greater than said stretched shock cord width dimension, while said width dimension of said passage when said collet piece is at said narrow end of said tapered opening is less than said stretched shock cord width dimension.

2. An adjustable holding device as in claim 1, wherein said casing includes a means for preventing said collet piece from coming out of said casing when said shock cord is pulled in a direction away from a top end of said casing when said casing is held.

3. An adjustable holding device as in claim 1, wherein said casing includes a means for preventing said collet piece from coming out of said casing when said shock cord is pulled in a direction away from a bottom end of said casing when said casing is held.

4. An adjustable holding device as in claim 1, wherein said collet includes two jaws which close as the collet moves toward the bottom of said tapered opening.

5. An adjustable holding device as in claim 4, wherein said jaws include teeth on a side of said jaw facing said shock cord.

6. An adjustable holding device as in claim 1, wherein said collet includes a plurality of jaws which close around the shock cord as the collet moves toward the bottom of said tapered opening.

7. An adjustable holding device as in claim 1, wherein said shock cord has a generally circular cross section.

8. An adjustable holding device as in claim 1, wherein said shock cord has a generally flat cross section.

9. An adjustable holding device as in claim 8, wherein said collet piece comprises two symmetrical halves which each include collet piece alignment tabs and collet piece alignment holes which interact to align the two collet piece halves.

10. An adjustable holding device as in claim 1, wherein said collet piece comprises two symmetrical interlocking halves which surround said shock cord when assembled.

11. An adjustable holding device as in claim 10, wherein said halves include a projecting locking tab, wherein as said assembled halves are being mated with said casing, said locking tabs pivot to fully enter the casing and snap into a locking tab slot in said casing preventing the removal of the collet piece from said casing.

12. An adjustable holding device as in claim 10, wherein said halves when assembled include a key projection which slides in a key slot in said casing when said collet piece is in said casing.

13. An adjustable holding device as in claim 1, wherein said collet piece includes jaws having a predefined perimeter configuration at a nose portion of said collet,
    wherein said casing includes an internal configuration such that each jaw nests with its own separate tapered cavity in said casing which closely matches said predefined perimeter configuration of said nose portion of said jaws, from said wide end to said narrow end of said tapered opening.

14. An adjustable holding device as in claim 1, wherein casing is configured to be attached to a hook structure.

15. An adjustable holding device as in claim 1, wherein casing is integral to a hook structure.

16. A method of adjusting the location of an adjustable holding device as in claim 1, on a shock cord comprising the steps of:
    assuring that said collet piece disposed in said passage is at said wide end of said opening by holding said casing and pulling said shock cord passing from an end of said casing associated with said wide opening of said tapered opening until the collet piece is observed adjacent to said wide end of said casing;
    stretching said shock cord so that the width of the cord reaches said stretched shock cord width dimension;
    sliding a casing assembly, comprising said casing and collet, from a first location on said shock cord to a second dimension on said shock cord; and
    releasing said shock cord from being stretched and allowing its width to return to said fully relaxed shock cord width dimension.

17. An adjustable holding device as in claim 1, wherein said collet piece includes a sleeve which surrounds said shock cord.

18. An adjustable holding device as in claim 17, wherein said sleeve is connected to a set of jaw arms spaced generally evenly around said shock cord, such that when said set of jaw arms is moved from said wide end of said tapered opening toward said narrow end of said casing the ends of the jaw arms furthest from said sleeve close together and clamp the shock cord between them.

19. An adjustable holding device as in claim 18, wherein said sleeve and said set of jaw arms are configured to spread the jaw arms when said collet piece moves from said narrow end of said opening towards said wide end of said opening.

20. An adjustable holding device as in claim 19 wherein said sleeve extends beyond said casing and is configured to prevent said sleeve from passing through said narrow end of said tapered opening.

21. An adjustable holding device as in claim 20 wherein the jaw arms are configured so that when the jaw arm ends are contacting one another they will be stopped before passing beyond the narrow end of the tapered opening when said jaw arms are being moved from said wide end to said narrow end of tapered opening.

22. An adjustable holding device as in claim 1, wherein said collet piece is configured to urge said collet piece toward a wide end of said casing, said wide end of said casing being associated with said wide end of said tapered opening.

23. An adjustable holding device as in claim 1, wherein said casing is a rigid material in one piece.

24. An adjustable holding device comprising:
a shock cord having a fully relaxed shock cord width dimension, a stretched shock cord width dimension, and a longitudinal axis;
a casing having a longitudinal axis, said casing having a tapered opening generally parallel to said longitudinal axis, said tapered opening having a wide end and a narrow end;
a collet, a portion of said collet being disposed in said tapered opening of said casing, said collet having a collet sleeve, said collet sleeve having a sleeve opening that is disposed generally parallel to said longitudinal axis of said casing, said collet sleeve opening having an inside width dimension at a narrowest point of said sleeve opening that is greater than said stretched shock cord width dimension and is smaller than said fully relaxed shock cord width dimension, said collet sleeve is connected to a collet jaw arm, said collet jaw arm having a neck portion and a nose portion, said neck portion connects said collet sleeve to said nose portion, when said nose portion is brought generally parallel to said longitudinal axis of said casing said nose portion has a width dimension generally perpendicular to said longitudinal axis of said casing, when said nose portion width dimension is subtracted from a width dimension of said narrow end of said tapered opening of said casing the remainder is less than said stretched shock cord width dimension, said shock cord being disposed in and passing through said casing such that said portion of said collet disposed in said tapered opening is located between said casing and said shock cord, said shock cord passing through said sleeve portion of said collet;
wherein said longitudinal axis of said shock cord is generally parallel to said longitudinal axis of said casing.

25. An adjustable holding device as in claim 24, wherein said casing and said collet are configured so that when said nose portion is disposed at said wide end of said taper and said nose portion width dimension is subtracted from a width dimension of said wide end the remainder is greater than said fully relaxed shock cord width dimension.

26. An adjustable holding device as in claim 25, wherein said collet is configured so as to urge said nose portion away from said longitudinal axis of said casing and into contact with a surface of said tapered opening.

27. An adjustable holding device as in claim 26, wherein said collet includes two or more collet jaw arms generally symmetrically disposed about the longitudinal axis of said casing, such that when said casing is held fixed and said shock cord is pulled in generally along the longitudinal axis of said casing, a frictional force between the outside of said shock cord and said collet sleeve causes said collet to move with said shock cord, movement of the collet sleeve causes the collet neck portions to pull each nose portion of said two or more collet jaws along said tapered opening to close the space between them and clamp on the shock cord, once the clamping (frictional) force on the shock cord generated by the nose portions of the collet jaws on the shock cord exceeds the frictional force between the outside of said shock cord and said collet sleeve increases in the pulling force on the shock cord will cause the diameter of the shock cord to stretch from a point on said shock cord where the collet jaws clamp on the cord.

28. An adjustable holding device as in claim 24, wherein when said neck portion is brought generally parallel to said longitudinal axis of said casing said neck portion has a width dimension generally perpendicular to said longitudinal axis of said casing,
wherein said neck portion of said casing and said collet are configured so that when said nose potion is disposed beyond said wide end of said taper, a portion of said neck portion disposed at said wide end of said taper has a width dimension which when subtracted from a width dimension of said wide end the remainder is greater than said fully relaxed shock cord width dimension.

* * * * *